(12) United States Patent
Lee

(10) Patent No.: US 6,466,620 B1
(45) Date of Patent: Oct. 15, 2002

(54) METHOD AND APPARATUS FOR ADAPTIVELY CODING VIDEO SIGNALS

(75) Inventor: Sang-Hoon Lee, Seoul (KR)

(73) Assignee: Daewoo Electronics Co., Ltd., Seoul (KR)

( * ) Notice: Subject to any disclaimer, the term of this patent is extended or adjusted under 35 U.S.C. 154(b) by 0 days.

(21) Appl. No.: 09/186,334

(22) Filed: Nov. 5, 1998

(30) Foreign Application Priority Data

Aug. 31, 1998 (KR) .............................................. 98-35579

(51) Int. Cl.[7] ................................................. H04N 7/30
(52) U.S. Cl. ............................... 375/240.03; 375/240.24
(58) Field of Search .................... 341/50; 358/432–433; 375/240.01–240.07, 240.12, 240.18, 240.2, 240.23, 240.24; 382/232, 236, 238, 244–246, 248, 250, 251; H04N 7/30, 7/32

(56) References Cited

U.S. PATENT DOCUMENTS

| | | | | |
|---|---|---|---|---|
| 5,299,025 A | * | 3/1994 | Shirasawa | 358/432 |
| 5,434,567 A | * | 7/1995 | Mack et al. | 341/50 |
| 5,533,138 A | * | 7/1996 | Kim et al. | 375/240.2 |
| 5,535,013 A | * | 7/1996 | Murata | 358/433 |
| 5,559,557 A | * | 9/1996 | Kato | 375/240.03 |
| 5,933,533 A | * | 8/1999 | Fukuda et al. | 375/240.04 |
| 6,005,622 A | * | 12/1999 | Haskell et al. | 375/240.24 |
| 6,148,109 A | * | 11/2000 | Boon et al. | 382/238 |

FOREIGN PATENT DOCUMENTS

EP          0559982         9/1993

* cited by examiner

Primary Examiner—Richard Lee
(74) Attorney, Agent, or Firm—Pennie & Edmonds LLP

(57) ABSTRACT

The method and apparatus capable of adaptively coding intra-video signals by separately predicting intra DC and AC coefficients is provided. The method comprises the steps of finding a DC reference block among the previously coded blocks based on a correlation of the DC coefficients of the previously coded blocks; setting a DC coefficient of the DC reference block as a DC reference coefficient; determining one of the previously coded blocks as an AC reference block based on a correlation of selected AC coefficients of the previously coded blocks; generating AC reference coefficients based on AC coefficients of the AC reference block; and encoding coefficients of the current block based on the DC and the AC reference coefficients. The apparatus includes a transform block, a quantization block, a memory, a prediction block, and an entropy coding block.

12 Claims, 8 Drawing Sheets

US 6,466,620 B1

METHOD AND APPARATUS FOR ADAPTIVELY CODING VIDEO SIGNALS

FIELD OF THE INVENTION

The present invention relates to a method and apparatus for adaptively coding video signals; and, more particularly, to a method and apparatus capable of adaptively the coding video signals by way of predicting intra DC and AC coefficients, separately.

DESCRIPTION OF THE PRIOR ART

In digitally televised systems such as video-telephone, teleconference and high definition television systems, a large amount of digital data is needed to define each video frame signal since the video frame signal comprises a sequence of digital data referred to as pixel values. Since, however, an available frequency bandwidth of a conventional transmission channel is limited, in order to transmit the large amount of digital data therethrough, it is necessary to compress or reduce the volume of the data through the use of various data compression techniques, especially in the case of such low bit-rate video signal encoders as video-telephone and teleconference systems.

Among various video compression techniques, the so-called hybrid coding technique, which combines temporal and spatial compression techniques together with a statistical coding technique, is known to be most effective. Most hybrid coding techniques employ a motion compensated DPCM (Differential Pulse Coded Modulation), two-dimensional transform, e.g., DCT (Discrete Cosine Transform), quantization of transform coefficients, and an entropy coding, e.g., VLC (Variable Length Coding).

In the conventional MPEG-4 (Moving Picture Expert Group-4) coding scheme, an intra-mode input video signal is divided into blocks of M×N, e.g., 8×8, pixels and each block is transformed to a set of quantized coefficients, i.e., a DC and a plurality of AC quantized coefficients, through the use of two-dimensional transform, e.g., DCT and quantization thereof, M and N being positive integers. A set of quantized coefficients of a block is then DPCM coded based on a set of quantized coefficients of one of previously coded blocks in the frame.

Referring to FIG. 1, there is shown a portion of blocks of an intra-frame. In MPEG-4, a reference block RB of a current block is determined among a left and an upper blocks of the current block based on DC coefficients of the left and the upper and a left-upper blocks of the current block. If a current block is 108, a reference block RB thereof is determined as:

If $|D3-D1|<|D1-D2|$, then

RB is the upper block 104, else

RB is the left block 106                    (Eq. 1)

wherein D1, D2 and D3 are DC quantized coefficients of the blocks 102, 104 and 106, respectively.

In other words, if the horizontal correlation between the DC quantized coefficients of the previously coded blocks is greater than the vertical correlation, i.e., $|D1-D2|<|D3-D1|$, the previously coded left block 106 is selected as the RB for the current block 108; and if otherwise, the previously coded upper block 104 is selected. Thereafter, a DPCM DC coefficient for the current block 108 is generated by calculating the difference between the DC quantized coefficient of the RB and that of the current block 108.

According to the conventional MPEG-4 coding method, the RB determined based on the DC quantized coefficients of the previously coded blocks is also used in predicting the AC quantized coefficients of the current block without considering the correlations between the AC quantized coefficients of the previously coded blocks, which may result in degraded coding efficiency.

SUMMARY OF THE INVENTION

It is, therefore, an object of the present invention to provide a method and apparatus capable of adaptively coding intra-video signals by separately predicting intra DC and AC coefficients.

In accordance with the present invention, there is provided a method for encoding a current block of a video signal based on P previously coded blocks, each of the current block and the previously coded blocks having M×N coefficients of a DC and a plurality of AC coefficients and P being an integer greater than 2, comprising the steps of:

(a) finding a DC reference block among the previously coded blocks based on a correlation of the DC coefficients of the previously coded blocks;

(b) setting a DC coefficient of the DC reference block as a DC reference coefficient;

(c) determining one of the previously coded blocks as an AC reference block based on a correlation of selected AC coefficients of the previously coded blocks;

(d) generating AC reference coefficients based on AC coefficients of the AC reference block; and (e) encoding coefficients of the current block based on the DC and the AC reference coefficients.

In accordance with the present invention, there is provided an apparatus for encoding a video signal, the video signal is divided into a plurality of blocks of M×N pixels, comprising: a transform block for transforming the video signal on a block-by-block basis to thereby a set of M×N transform coefficients for each block, wherein the transform coefficients includes a DC and a multiplicity of AC transform coefficients; a quantization block for quantizing the set of transform coefficients for each block to provide a set of M×N quantized DC and AC coefficients; a memory for storing the set of quantized coefficients for each block; a prediction block for determining a DC reference block and an AC reference block of a current block based on quantized DC coefficients and quantized AC coefficients of previously coded blocks to thereby provide a set of DPCM (differential Pulse Coded Modulation) DC and AC coefficients of the current block based on quantized DC and AC coefficients of the DC and the AC reference blocks; and an entropy coding block for entropy coding the DPCM DC and the DPCM AC coefficients.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
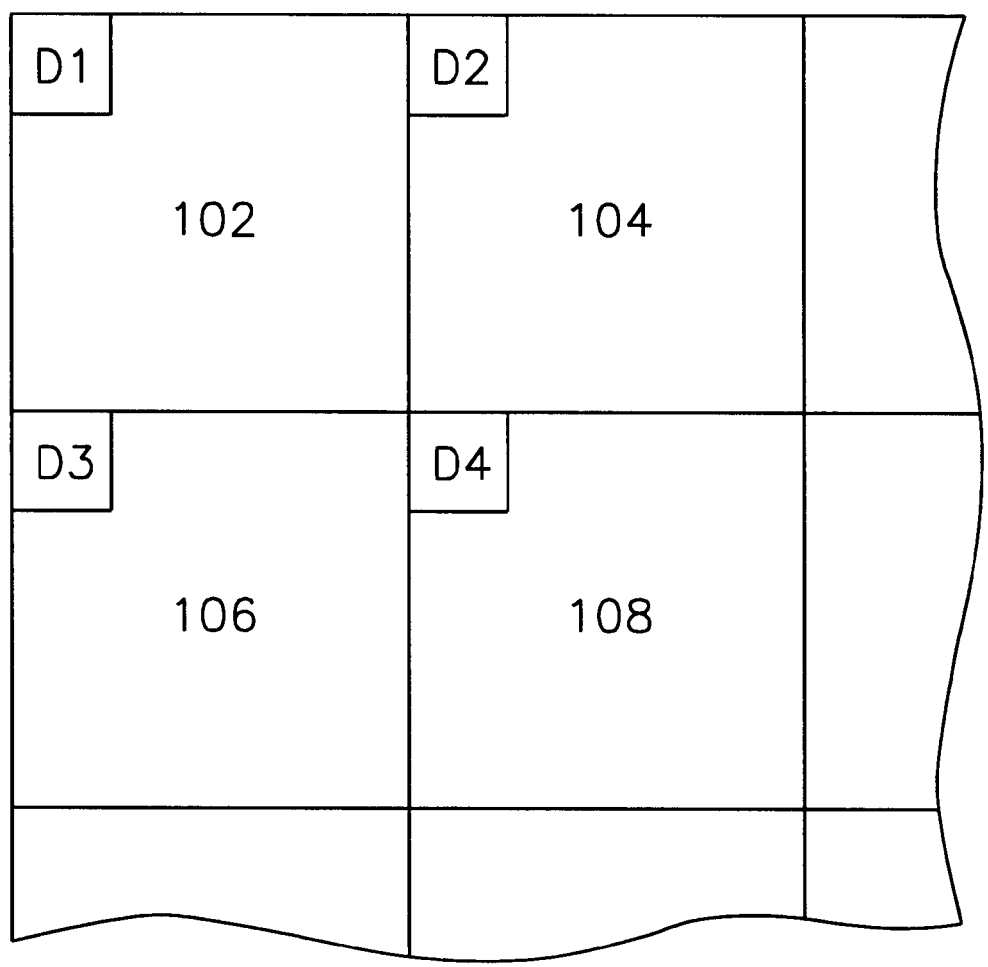
FIG. 1 shows a portion of blocks of a frame.
Figure 2:
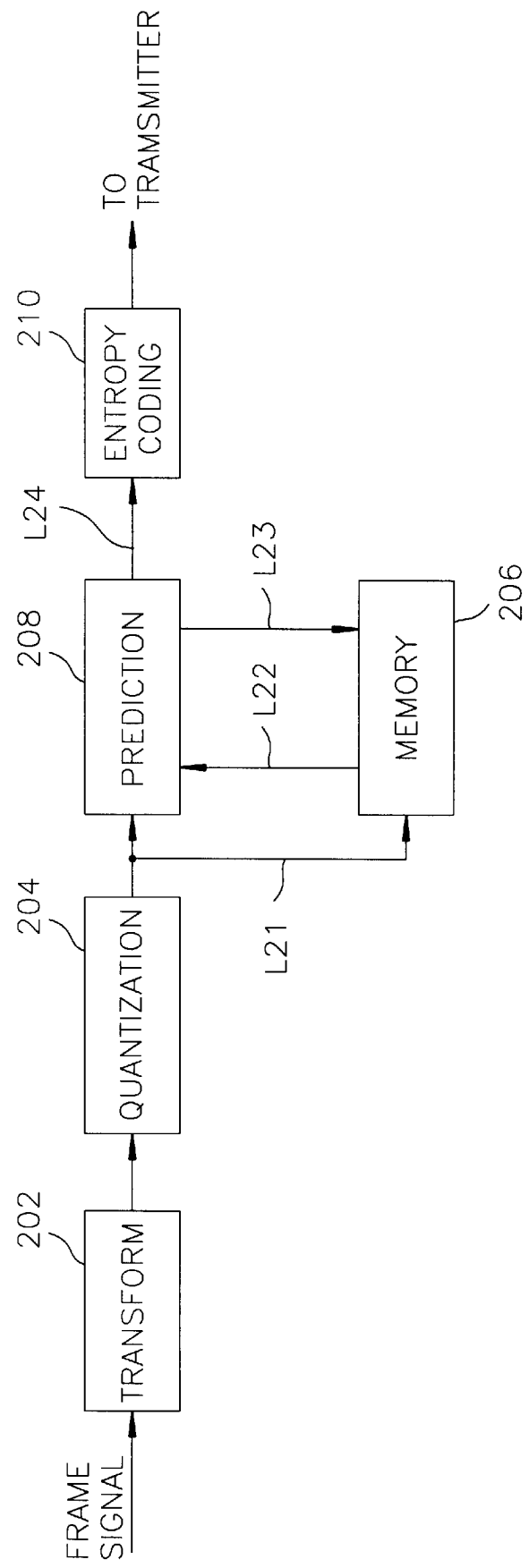
FIG. 2 represents a schematic block diagram of an apparatus capable of adaptively coding video signals in accordance with the present invention.

Referring to FIG. 2, there is shown a schematic block diagram of an apparatus capable of adaptively coding intra-video signals in accordance with the present invention.

The apparatus of the present invention comprises a transform block 202, a quantization block 204, a memory block 206, a prediction block 208 and an entropy coding block 210. A intra-frame signal divided into blocks of M×N, e.g., 8×8, pixels, M and N being positive integers, is inputted to the transform block 202 on a block basis. The transform block 202 transforms each input block into a set of transform coefficients including one DC and, e.g., 63, AC coefficients by using, e.g., DCT method. The set of DC and AC transform coefficients constitutes a coefficient block of M×N, e.g., 8×8, coefficients, wherein the first coefficient positioned at the upper-left corner of the coefficient block corresponds to the DC transform coefficient and the others are AC transform coefficients whose horizontal and vertical frequencies increase along the zigzag scanning order. Thereafter, the transform block 202 provides the quantization block 204 with the generated set of transform coefficients.

The quantization block 204 quantizes the set of transform coefficients to create a set of quantized coefficients for each block. The set of quantized coefficients are transmitted to the prediction block 208 and the memory block 206 via a line L21. The memory 206 stores the set of quantized coefficients fed thereto.

The prediction block 208 performs a predictive coding on a current block based on the sets of quantized coefficients of previously coded blocks and generates a set of DPCM coefficients for the current block. Thereafter, the entropy coding block 210 codes the set of DPCM coefficients through the use of, e.g., VLC technique, and provides the coded DPCM coefficients to a transmitter (not shown) for the transmission thereof.

Figure 3:
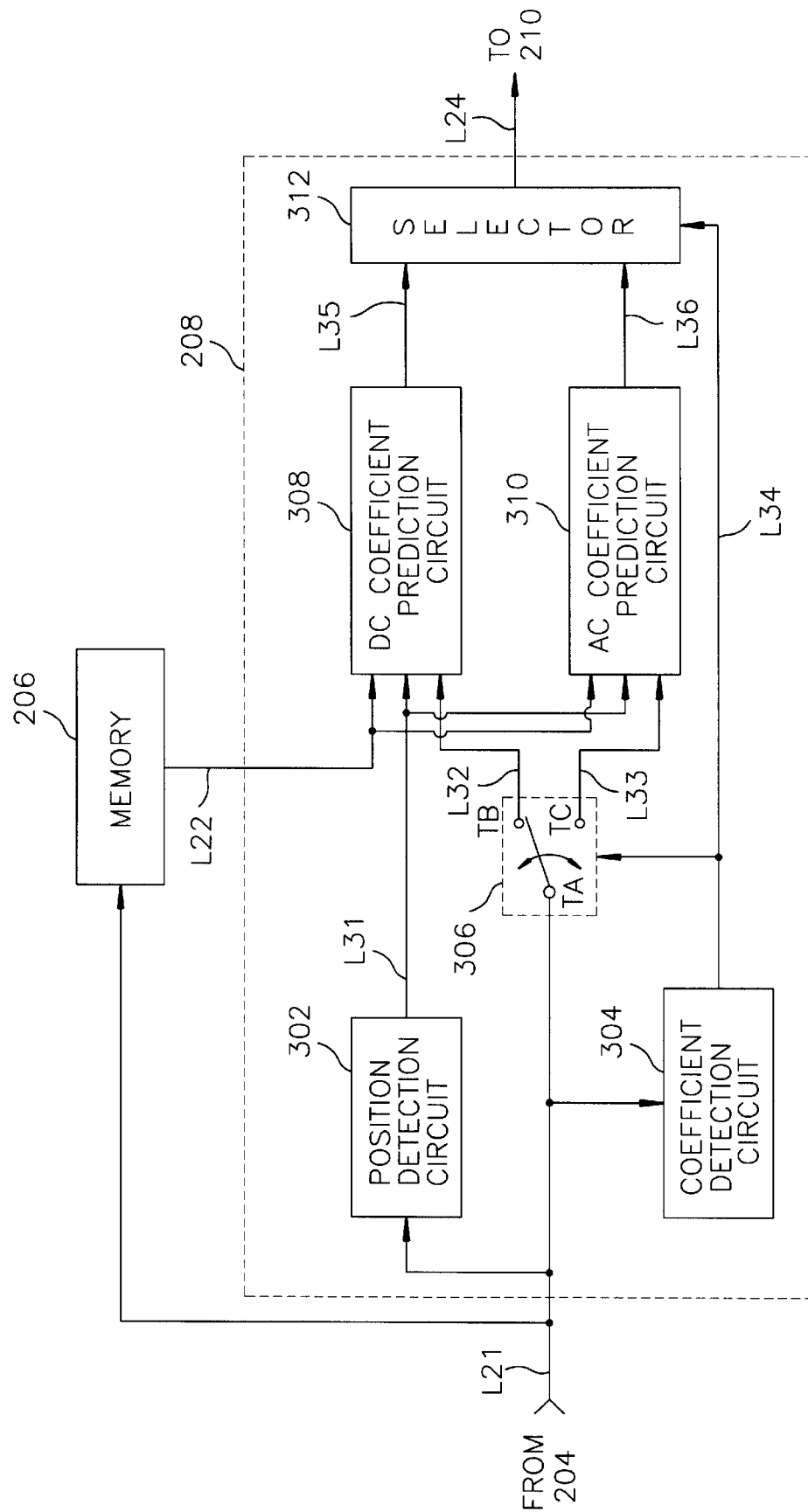
FIG. 3 illustrates a schematic block diagram of a prediction block shown in FIG. 2.

Now, the detailed operation of the prediction block 208 will be described with reference to FIGS. 3 to 6. Referring to FIG. 3, there is shown a schematic block diagram of the prediction block 208 shown in FIG. 2. As shown in FIG. 3, the prediction block 208 includes a position detection circuit 302, a coefficient detection circuit 304, a switch 306 having terminals TA, TB and TC, a DC coefficient prediction circuit 308, an AC coefficient prediction circuit 310 and a selector 312.

The position detection circuit 302 identifies the position of a current block being processed in response to position data of the current block fed thereto along with the set of quantized coefficients from the quantization block 204 via the line L21. The position data may be provided from a system controller (not shown), separately from the set of quantized coefficients. The position detection circuit 302 provides the detected position of the current block to the DC and the AC coefficient prediction circuits 308 and 310 through a line L31. The coefficient detection circuit 304 detects whether each coefficient in the set fed thereto via the line L21 is a DC or an AC quantized coefficient and generates a corresponding signal for controlling the switch 306 and the selector 312 via a line L34.

If the detected coefficient is a DC coefficient, the coefficient detection circuit 304 generates a first selection signal that controls the switch 306 to connect the terminal TA to the terminal TB and the selector 312 to select an output on a line L35; and if otherwise, it generates a second selection signal that controls the switch 306 to connect the terminal TA to the terminal TC and the selector 312 to select an output on a line L36.

The DC coefficient prediction circuit 308 generates a DPCM DC coefficient of the current block on the line L35 and the AC coefficient prediction circuit 310 generates DPCM AC coefficients of the current block on the line L35.

Thereafter, the selector 312 selects the output of the DC coefficient prediction circuit 308 or that of the AC coefficient prediction circuit 310 according to the selection signals fed from the coefficient detection circuit 304 and provides the selected output to the entropy coding block 210 shown in FIG. 2 via the line L24.

Figure 4:
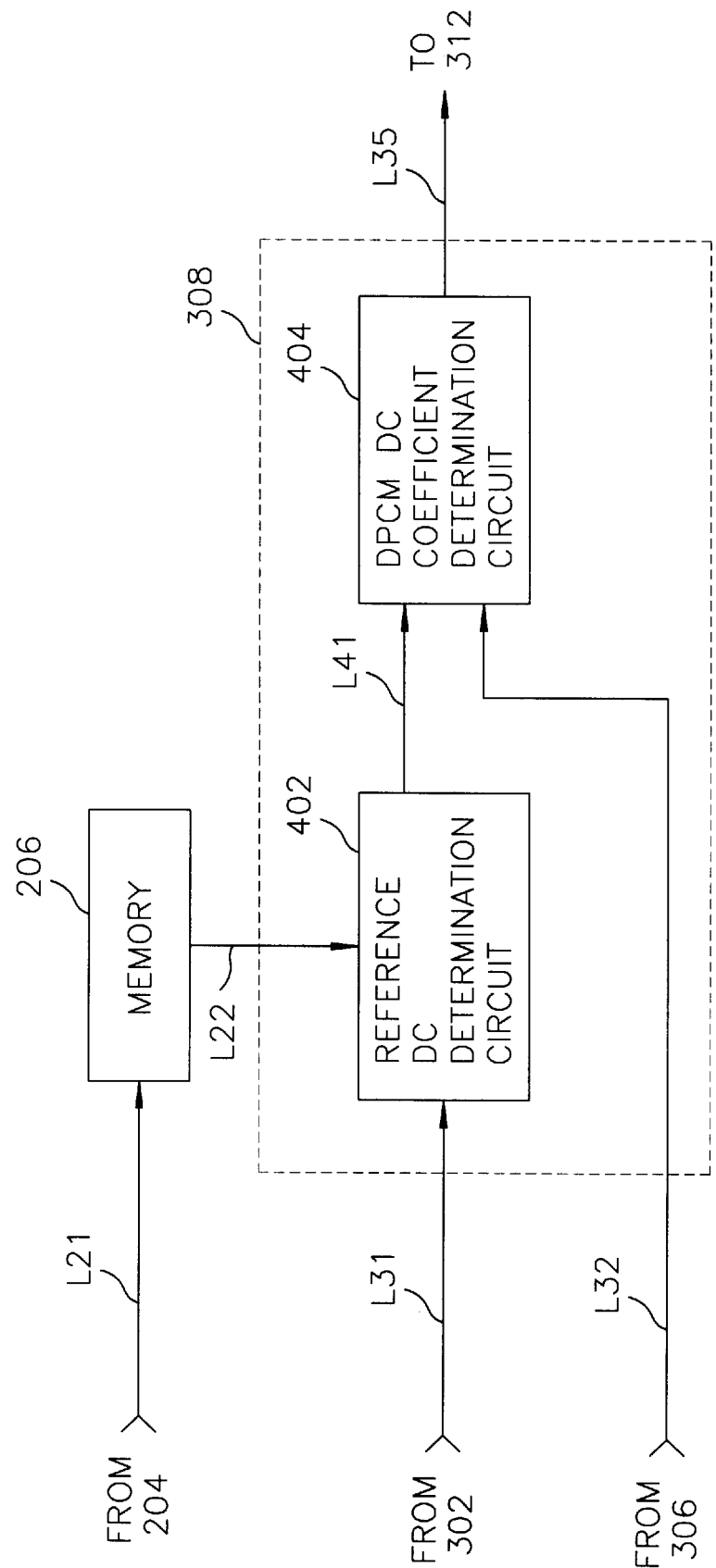
FIG. 4 depicts a detailed block diagram of a DC coefficients prediction circuit shown in FIG. 3.

Referring to FIG. 4, there is shown a detailed block diagram of the DC coefficient prediction circuit 308 shown in FIG. 3. As shown in FIG. 4, the DC coefficient prediction circuit 308 has a reference DC determination circuit 402 and a DPCM DC coefficient determination circuit 404. The reference DC determination circuit 402 receives the position information fed from the position detection circuit 302 shown in FIG. 3 via the line L31 and determines to which one of the blocks 602–608 shown in FIG. 6 the current block belongs, wherein the position information represents the position of the current block in the frame.

If the current block is of the kind 602, the first block in the frame having no previously coded blocks, the reference DC determination circuit 402 transmits zero as a reference DC value to the DPCM DC coefficient determination circuit 404 via a line L41. If the position information represents that the current block of the type, the block 604 or 606, which is only one adjacent previously coded block, i.e., 602, the reference DC determination circuit 402 determines the block 602 as the reference block RB thereof to thereby provide, as the reference DC value, the quantized DC coefficient D1 of the block 602 from the memory 206 to the DPCM DC coefficient determination circuit 404. In case that the current block is one of the blocks, each having previously coded upper and left blocks, e.g., the block 608, the reference DC determination circuit 402 retrieves the quantized DC coefficients D1, D2 and D3 of the upper-left, the upper and the left blocks 602, 604 and 606 of the current block 608; determines one of the upper and the left blocks 604 and 606 as a RB of the current block 608 by using Eq. 1 described above; and transmits the quantized DC coefficient of the RB as the reference DC value to the DPCM DC coefficient determination circuit 404 via the line L41.

Thereafter, the DPCM DC coefficient determination circuit 404 calculates the difference value between the reference DC value and the quantized DC coefficient of the current block fed from the switch 306 via the line L32; and provides the selector 312 with same as a DPCM DC coefficient of the current block.

Figure 5:
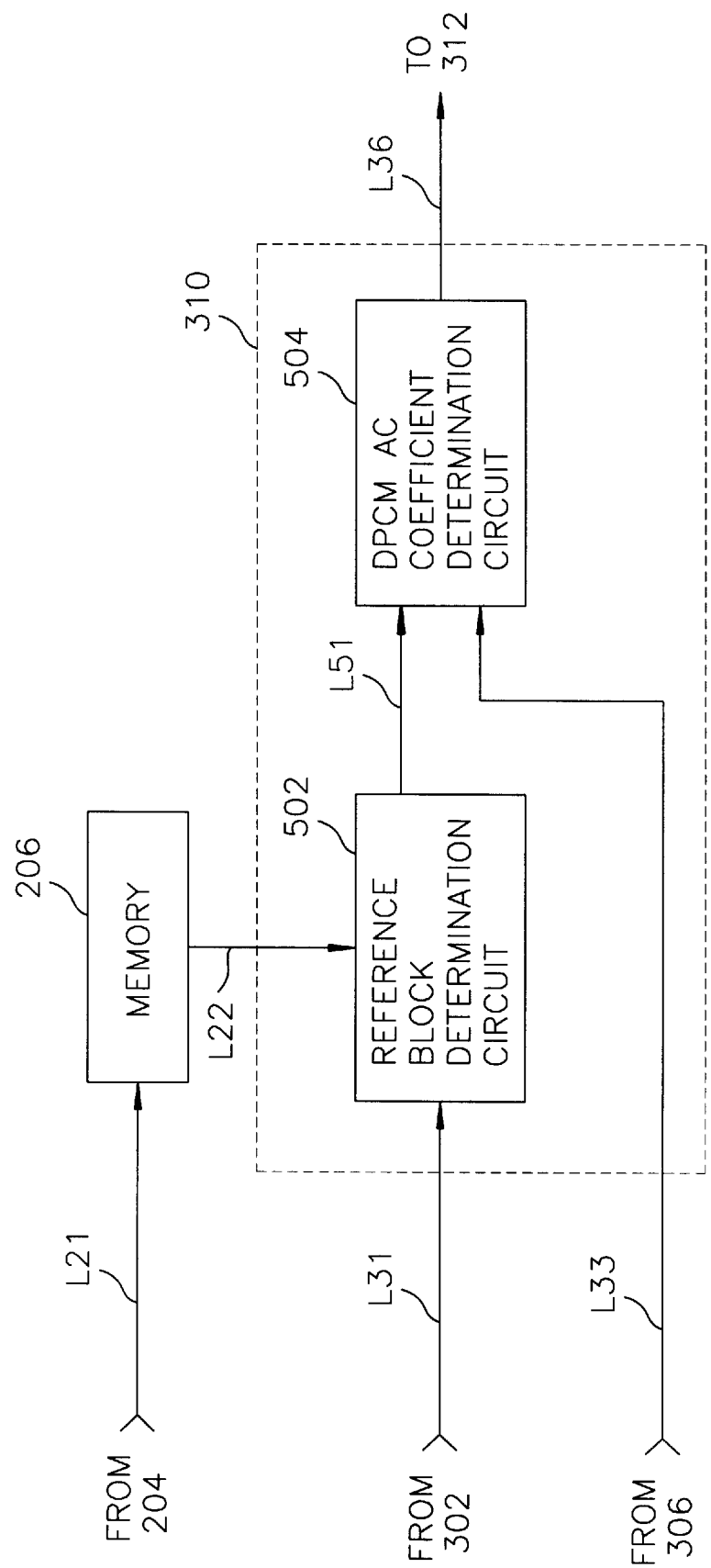
FIG. 5 presents a detailed block diagram of an AC coefficients prediction circuit shown in FIG. 3.

Referring to FIG. 5, there is shown a detailed block diagram of the AC coefficient prediction circuit 310 shown in FIG. 3. As shown in FIG. 5, the AC coefficient prediction circuit 310 has a reference block determination circuit 502 and a DPCM AC coefficient determination circuit 504. The reference block determination circuit 502 receives the position information of the current block fed from the position detection circuit 302 shown in FIG. 3 via the line L31. Thereafter, the reference block determination circuit 502 examines to which one of the block types 602, 604, 606 or 608 the current block belongs.

If the current block is of the block type 602, since there is no previously coded blocks, the reference block determination circuit 502 set zeros as reference AC coefficients for the current block and transmits same to the DPCM AC coefficient determination circuits 504 via a line L51. If the current block belongs to one of the block types 604 or 606 which has only one previously coded adjacent block, i.e., 602, the reference block determination circuit 502 determines the unique previously coded adjacent block 602 as the RB for the current block.

In case that the current block is of the block type 608 having the upper and the left previously coded adjacent blocks 604 and 606, the reference block determination circuit 502 retrieves from the memory 206 via the line L22, Ah1 and Ah2, the first horizontal AC quantized coefficients of the upper-left and the upper blocks 602 and 604, and Av1 and Av3, the first vertical AC quantized coefficients of the upper-left and the left blocks 602 and 606; and determines a RB for the current block 608 by computing a horizontal and a vertical correlations as:

$$(HC)^{-1} = |Ah1-Ah2|$$
$$(VC)^{-1} = |Av1-Av3| \quad \text{(Eq. 2)}$$

wherein the HC and the VC represent the horizontal and the vertical correlations for the AC quantized coefficients of the previously coded blocks, respectively.

If the horizontal correlation HC is greater than the vertical correlation VC, i.e., $|Ah1-Ah2|<|Av1-Av3|$, the reference block determination circuit 502 determines the previously coded block 606 as the RB for the current block 608; and if otherwise, it determines the previously coded block 604 as the RB. Thereafter, the reference block determination circuit 502 provides via the line L51 the DPCM AC coefficients determination circuit 504 with a set of reference AC coefficients. In accordance with the present invention, the AC coefficients in the first row of the set of reference AC coefficients are identical to those of the RB and the remaining reference AC coefficients are all set to zeros if the RB is the upper block of the current block. Similarly, the AC coefficients in the first column of the set of reference AC coefficients are identical to those of the RB and the remaining reference AC coefficients are set to zeros in case the left block is determined as the RB.

The DPCM AC coefficients determination circuit 504 calculates DPCM AC coefficients by deriving differences between AC quantized coefficients of the current block on the line L33 and their corresponding reference AC coefficients on the line L51. The DPCM AC coefficients for the current block are provided to the selector 312 via the line L36.

Figure 7A:
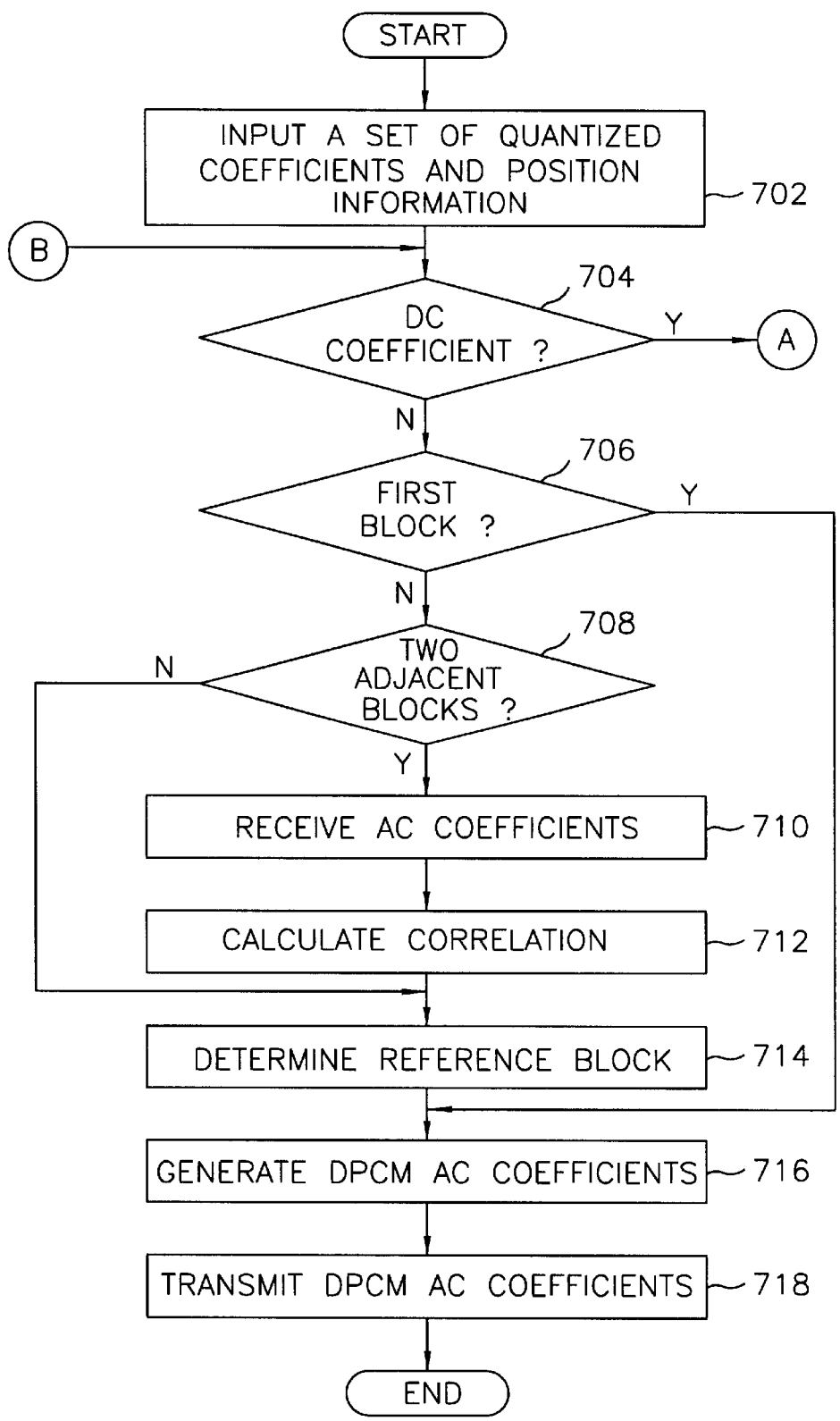
FIGS. 7A and 7B are a flow chart of the procedure for adaptively coding the video signals in accordance with the present invention.
Figure 7B:
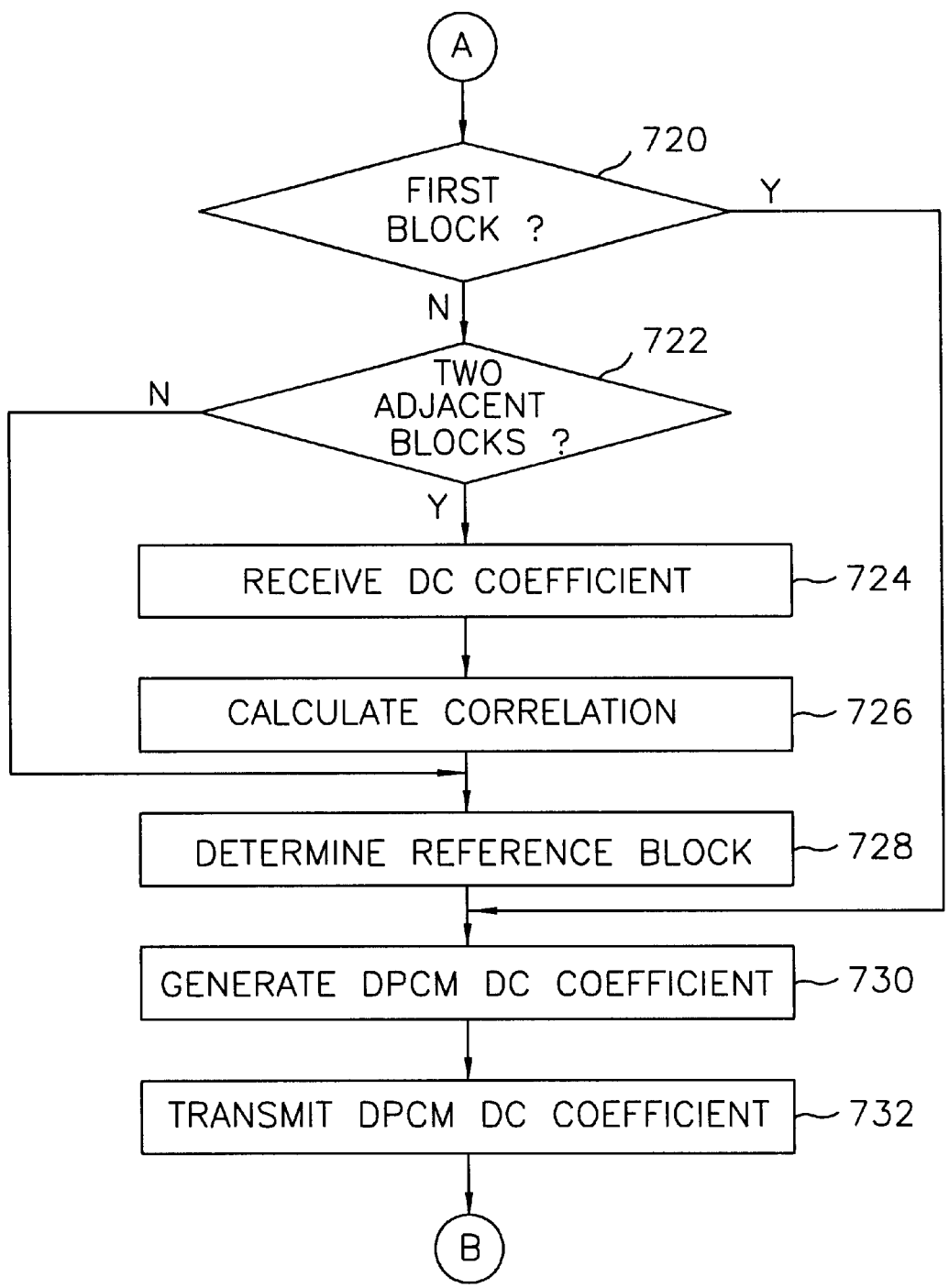

Referring to FIGS. 7A and 7B, there is shown a procedure describing the adaptive video signal coding scheme in accordance with the present invention. At step 702 shown in FIG. 7A, position information and a set of quantized coefficients having a DC and a plurality of AC coefficients of a current block are inputted. Thereafter, the process proceeds to step 704 to check whether each coefficients in the set is a DC or an AC quantized coefficient. If the check result is positive at step 704, the process proceeds to step 720 shown in FIG. 7B.

Figure 6:
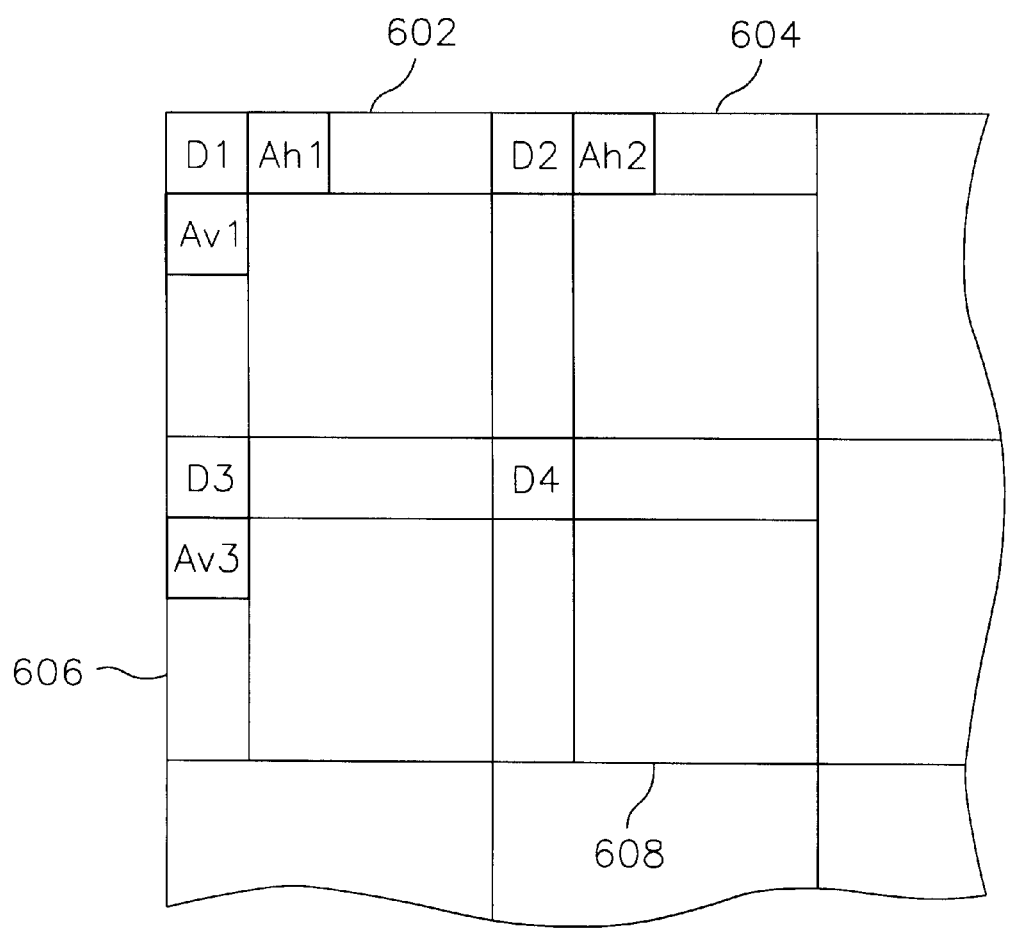
FIG. 6 exemplifies a portion of a frame in the transform domain.

At step 720, it is checked whether the current block belongs to which one of the blocks 602–608 shown in FIG. 6 based on the received position information thereof. If the check result is positive at step 720, the process proceeds to step 730; and if otherwise, it proceeds to step 722. At step 722, it is again checked whether the current block belongs to the block 608. If the check result is negative at step 722, the process proceeds to step 728; and if otherwise, it proceeds to step 724 to retrieve the quantized DC coefficients D1, D2 and D3 of the upper-left, the upper and the left blocks 602, 604 and 606 of the current block 608. Thereafter, at step 726, the process calculates a correlation between the quantized DC coefficients D1, D2 and D3 of the blocks 602, 604 and 606 and proceeds to step 728.

At step 728, the process determines one of the upper and the left blocks 604 and 606 as a reference block RB of the current block by using Eq. 1 described above to thereby select the quantized DC coefficient of the RB as the reference DC value of the current block. Thereafter, at step 730, the process calculates the difference value between the reference DC value and the quantized DC coefficients of the current block to thereby generate a DPCM DC coefficient of the current block. At step 732, the DPCM DC coefficient is transmitted and the process is returns to step 704 shown in FIG. 7A.

In case that the check result is negative at step 704, the process proceeds to step 706. At step 706, it is checked whether the current block belongs to which one of the blocks 602–608 shown in FIG. 6 based on the received position information thereof. If the check result is positive at step 706, the process proceeds to step 716; and if otherwise, it proceeds to step 708. At step 708, it is again checked whether the current block belongs to the block 608 having the upper and the left previously coded adjacent blocks 604 and 606. If the check result is negative at step 708, the process proceeds to step 714; and if otherwise, it proceeds to step 710 to retrieve the first horizontal AC quantized coefficients of the upper-left and the upper blocks 602 and 604, and the first vertical AC quantized coefficients of the upper-left and the 602 and 606. Thereafter, at step 712, the process calculates correlations between the first horizontal AC quantized coefficients and the first vertical AC quantized coefficients by using Eq. 2 described above and proceeds to step 714.

At step 714, the process determines one of the upper and the left blocks 604 and 606 as a reference block RB of the current block based on the correlation result. If the RB is the left block of the current block, the AC coefficients in the first row of the set of reference AC coefficients are identical to those of the RB and the remaining reference AC coefficients are all set to zeros. If otherwise, i.e., the upper block is determined as the RB, the AC coefficients in the first column of the set of reference AC coefficients are identical to those of the RB and the remaining reference AC coefficients are set to zeros.

Thereafter, at step 716, the process derives the differences between AC quantized coefficients of the current block and their corresponding reference AC coefficients of the RB to thereby generate DPCM AC coefficients for the current block. At step 718, the DPCM AC coefficients are transmitted and the process is terminated.

While the present invention has been described with respect to certain preferred embodiments only, other modifications and variations may be made without departing from the spirit and scope of the present invention as set forth in the following claims.

What is claimed is:

1. A method for encoding a current block of a video signal based on P previously coded blocks, each of the current block and the previously coded blocks having M×N coefficients of a DC and a plurality of AC coefficients and P being an integer greater than 2, comprising the steps of:

(a) finding a DC reference block among the previously coded blocks based on a correlation of the DC coefficients of the previously coded blocks;

(b) setting a DC coefficient of the DC reference block as a DC reference coefficient;

(c) determining one of the previously coded blocks as an AC reference block based on a correlation of selected AC coefficients of the previously coded blocks;

(d) generating AC reference coefficients based on AC coefficients of the AC reference block; and (e) encoding coefficients of the current block based on the DC and the AC reference coefficients, wherein M and N equal to 8 and P is 3;

wherein the previously coded blocks are a left, an upper and an upper-left blocks of the current block; and wherein the AC reference block determining step (c) includes the steps of:

(c1) determining whether $|Ah1-Ah2|<|Av1-Av3|$, wherein Ah1 and Av1 are a first horizontal and a first vertical AC coefficients of the upper-left block; Ah2, a first horizontal AC coefficient of the upper block; and Av3, a first vertical AC coefficient of the left block;

(c2) if $|Ah1-Ah2|<|Av1-Av3|$, setting the left block as the AC reference block; and (c3) if otherwise, setting the upper block as the AC reference block.

2. The method of claim 1, wherein the first row of the AC reference coefficients are identical to that of the AC reference block if the upper block is the AC reference block and the first column of the AC reference coefficients are identical to that of the AC reference block if the left block is the AC reference block.

3. The method of claim 2, wherein the DC reference block finding step (a) includes the steps of:

(a1) determining whether $|D1-D2|<|D3-D1|$, wherein D1, D2 and D3 are DC coefficients of the upper-left, the upper and the left blocks, respectively;

(a2) if $|D1-D2|<|D3-D1|$, setting the left block as the DC reference block; and (a3) if otherwise, setting the upper block a DC reference block.

4. The method of claim 3, wherein the other AC reference coefficients than the first row or the first column identical to that of the AC reference block have zero values.

5. The method of claim 4, wherein the encoding step (e) includes the steps of:

(e1) calculating the difference values between the coefficients of the current block and the DC and the AC reference coefficients; and (e2) generating the difference values as encoded current block data.

6. An apparatus for encoding a video signal, the video signal is divided into a plurality of blocks of M×N pixels, comprising:

means for transforming the video signal on a block-by-block basis to thereby a set of M×N transform coefficients for each block, wherein the transform coefficients includes a DC and a multiplicity of AC transform coefficients;

means for quantizing the set of transform coefficients for each block to provide a set of M×N quantized DC and AC coefficients;

a memory for storing the set of quantized coefficients for each block;

means for determining a DC reference block and a single AC reference block of a current block to set a DC coefficient of the DC reference block as a DC reference coefficient and to generate AC reference coefficients based on AC coefficients of the AC reference block, wherein one of previous coded blocks is determined as the DC reference block based on a correlation of quantized DC coefficients of the previous coded blocks and one of the previous coded blocks is determined as the AC reference block based on a correlation of selected quantized AC coefficients of the previous coded blocks; and entropy coding means for encoding coefficients of the current block based on the DC and the AC reference coefficients, wherein M and N equal to 8;

wherein the previously coded blocks are a left, an upper and an upper-left blocks of the current block; and wherein the AC reference block determining means determines whether $|Ah1-Ah2|<|Av1-Av3|$, wherein Ah1 and Av1 are a first horizontal and a first vertical AC coefficients of the upper-left block; Ah2, a first horizontal AC coefficient of the upper block; and Av3, a first vertical AC coefficient of the left block.

7. The apparatus of claim 6, wherein the AC reference block determining means sets the left block as the AC reference block, if $|Ah1-Ah2|<|AV1-Av3|$; and if otherwise, determines the upper block as the AC reference block.

8. The apparatus of claim 7, wherein the first row of the AC reference coefficients are identical to that of the AC reference block if the upper block is the AC reference block and the first column of the AC reference coefficients are identical to that of the AC reference block if the left block is the AC reference block.

9. The apparatus of claim 8, wherein the DC reference block determining means determines whether $|D1-D2|<|D3-D1|$, wherein D1, D2 and D3 are DC coefficients of the upper-left, the upper and the left blocks, respectively.

10. The apparatus of claim 9, wherein the DC reference block determining means sets the left block as the DC reference block, if $|D1-D2|<|D3-D1|$; and if otherwise, determines the upper block as the DC reference block.

11. The apparatus of claim 10, wherein the other AC reference coefficients than the first row or the first column identical to that of the AC reference block have zero values.

12. The apparatus of claim 11, wherein the entropy coding means includes:

means for calculating the difference values between the coefficients of the current block and the DC and the AC reference coefficients; and means for generating the difference values as encoded current block data.

* * * * *